United States Patent
Singh et al.

(10) Patent No.: US 12,143,605 B2
(45) Date of Patent: Nov. 12, 2024

(54) INTER-PREDICTION MODE-DEPENDENT TRANSFORMS FOR VIDEO CODING

(71) Applicant: Google LLC, Mountain View, CA (US)

(72) Inventors: Rohit Singh, Sunnyvale, CA (US);
Debargha Mukherjee, Cupertino, CA (US); Elliott Karpilovsky, Santa Clara, CA (US); Lester Lu, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 274 days.

(21) Appl. No.: 17/543,126

(22) Filed: Dec. 6, 2021

(65) Prior Publication Data

US 2022/0094950 A1    Mar. 24, 2022

Related U.S. Application Data

(63) Continuation of application No. 16/919,507, filed on Jul. 2, 2020, now Pat. No. 11,197,004.

(51) Int. Cl.
*H04N 19/184* (2014.01)
*H04N 19/124* (2014.01)
*H04N 19/61* (2014.01)

(52) U.S. Cl.
CPC ......... *H04N 19/184* (2014.11); *H04N 19/124* (2014.11); *H04N 19/61* (2014.11)

(58) Field of Classification Search
CPC ..... H04N 19/184; H04N 19/124; H04N 19/61
See application file for complete search history.

(56) References Cited

U.S. PATENT DOCUMENTS 11,197,004 B1 * 12/2021 Singh .................. H04N 19/46
11,575,901 B2 *  2/2023 Fan ..................... H04N 19/159
(Continued)

FOREIGN PATENT DOCUMENTS

TW         201132129 A  *  9/2011  .............. H03M 7/30

OTHER PUBLICATIONS

Shibahara Youji translation of TW 201132129 A Sep. 16, 2011 (Year: 2011).*
(Continued)

*Primary Examiner* — Zaihan Jiang
(74) *Attorney, Agent, or Firm* — Young Basile Hanlon & MacFarlane, P.C.

(57) ABSTRACT

Transform modes are derived for inter-predicted blocks using side information. A prediction residual is generated for a current video block using a reference frame. Side information associated with one or both of the current video block or the reference frame is identified. A trained transform is determined from amongst multiple trained transforms based on the side information, in which each of the trained transforms is determined using individual side information types and combinations of the individual side information types and the side information represents values of one of the individual side information types or one of the combinations of the individual side information types. The prediction residual is transformed according to the trained transform, and data associated with the transformed prediction residual and the side information are encoded to a bitstream.

20 Claims, 10 Drawing Sheets

(56) References Cited

U.S. PATENT DOCUMENTS

| | | | | |
|---|---|---|---|---|
| 2012/0170857 | A1* | 7/2012 | He | H04N 19/13 |
| | | | | 382/233 |
| 2012/0179833 | A1* | 7/2012 | Kenrick | H04N 21/4333 |
| | | | | 709/231 |
| 2012/0183043 | A1* | 7/2012 | Cohen | H04N 19/157 |
| | | | | 375/240.03 |
| 2013/0039426 | A1* | 2/2013 | Helle | H04N 19/52 |
| | | | | 375/E7.256 |
| 2020/0084478 | A1* | 3/2020 | Xu | H04N 19/172 |
| 2022/0094950 | A1* | 3/2022 | Singh | H04N 19/46 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

Bankoski, et al., "Technical Overview of VP8, an Open Source Video Codec for the Web", Jul. 11, 2011, 6 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

"VP8 Data Format and Decoding Guide, WebM Project", Google On2, Dec. 1, 2010, 103 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

Xin Zhao, et al., "Rate-Distortion Optimized Transform for Intra-Frame Coding", 2010 IEEE International Conference on Acoustics, Speech and Signal Processing, Dallas, TX, 2010, pp. 1414-1417.

A. Arrufat, et al., "Rate-distortion optimised transform competition for intra coding in HEVC", IEEE VCIP, Dec. 2014, La Valette, Malta, 4 pgs.

* cited by examiner

INTER-PREDICTION MODE-DEPENDENT TRANSFORMS FOR VIDEO CODING

CROSS-REFERENCE TO RELATED APPLICATION(S)

This disclosure is a continuation of U.S. patent application Ser. No. 16/919,507, filed on Jul. 2, 2020, now issued as U.S. Pat. No. 11,197,004, the entire disclosure of which is herein incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

Disclosed herein are, inter alia, systems and techniques for inter-prediction mode-dependent transforms for video coding.

A method according to an implementation of this disclosure comprises generating a prediction residual for a current video block using a reference frame; determining, based on side information associated with one or both of the current video block or the reference frame, a trained transform for transforming the prediction residual from amongst multiple trained transforms determined using individual side information types and combinations of the individual side information types, wherein the side information represents values of one of the individual side information types or one of the combinations of the individual side information types; transforming the prediction residual according to the trained transform; and encoding data associated with the transformed prediction residual and the side information to a bitstream.

A method according to another implementation of this disclosure comprises transforming a prediction residual for a current video block according to a trained transform determined from amongst multiple trained transforms based on side information associated with one or both of the current video block or a reference frame used to generate the prediction residual, wherein the multiple trained transforms are associated with individual side information types and combinations of the individual side information types, and wherein the side information represents values of one of the individual side information types or one of the combinations of the individual side information types; and encoding, to a bitstream, data associated with the transformed prediction residual and the side information.

A method according to yet another implementation of this disclosure comprises encoding, to a bitstream, side information associated with one or both of a current video block or a reference frame available for generating a prediction residual of the current video block and data associated with transform coefficients resulting from transforming the prediction residual according to a trained transform determined based on the side information, wherein the trained transform is one of multiple trained transforms associated with individual side information types and combinations of the individual side information types.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
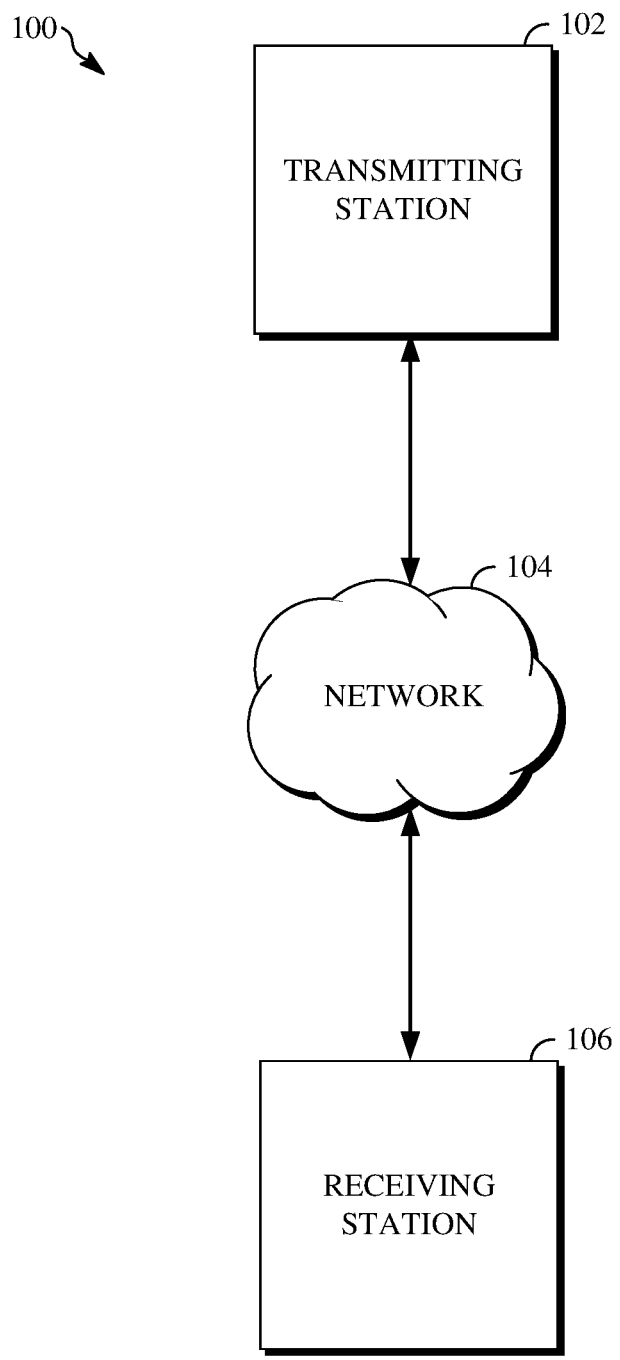
FIG. 1 is a schematic of an example of a video encoding and decoding system.

Video compression schemes may include breaking respective images, or frames, into smaller portions, such as blocks, and generating an encoded bitstream using techniques to limit the information included for respective blocks thereof. The encoded bitstream can be decoded to re-create the source images from the limited information. For example, a video compression scheme can include transforming the prediction residual for a current video block into a number of transform coefficients. The transform coefficients are quantized and entropy coded into an encoded bitstream. A decoder processes the encoded transform coefficients, including by inverse transformation, to decode or decompress the encoded bitstream to prepare the video stream for viewing or further processing.

A prediction residual block represents a difference between an original version of the current video block and a prediction block generated using a prediction source (e.g., another video block in a same video frame as the current video block or a video block in a different video frame of the video stream). The pixel values of the prediction residual block represent the information to actually encode to the bitstream for the current video block. The prediction residual is highly correlated, so a transform is used to decorrelate the prediction residual signal and reduce the amount of video data which must be encoded within a bitstream to reproduce the video block during decoding.

In certain codecs, such as AV1, the transform applied to a prediction residual includes a horizontal and vertical pair of one-dimensional (1D) transforms, which may be of the same transform type or of different transform types. For example, in AV1, each of the horizontal or vertical transform type may be a discrete cosine transform (DCT), an asymmetric direct sine transform (ADST), a flipped ADST, or an identity transform, such that there are 16 possible horizontal and vertical transform type pairs. During encoding, the transform (e.g., the horizontal and vertical transform type pair) for transforming the prediction residual is conventionally selected using a rate-distortion optimization. The precise choice of transform is heavily dependent upon statistics of the prediction residual block, and, in many cases, the existing set of available transforms is not optimal for decorrelation.

One solution uses an approach in which multiple available transforms are each evaluated for a given prediction residual during encoding and only one is signaled. However, this type of selection is too complicated to be practical given the typically large amount of prediction residual and related reference information to be evaluated. Another solution uses an intra-prediction mode-dependent transform, in which a single transform is learned for each intra-prediction mode. While this approach exploits the correlation between an intra-coded video block and the intra-prediction used to predict the video block, and thus keeps both the transform search complexity and resulting signaling cost low, it is only available to intra-predicted video blocks, as it cannot be used for motion vector-based prediction because prediction residual information is not carried.

Implementations of this disclosure address problems such as these by deriving transform modes for inter-predicted blocks using side information available within a bitstream. Transform coefficients of an inter-predicted encoded video block and side information associated with one or both of the inter-predicted encoded video block or one or more reference frames of the inter-predicted encoded video block are identified within a bitstream. Based on the side information, a trained transform is determined, such as from amongst multiple available trained transforms, for inverse transforming the transform coefficients of the inter-predicted encoded video block. The transform coefficients of the inter-predicted encoded video block are inverse transformed according to the trained transform to produce a prediction residual. A video block is reconstructed using the prediction residual and other inter-mode data, which may, for example, include information associated with the one or more reference frames. The video block is then output within an output video stream for storage or display.

To determine the trained transforms, a learning model uses individual side information types and combinations of the individual side information types processed against a training data set. The learning model classifies ones of the trained transforms which are effective for transforming or inverse transforming certain video data based on certain types and values of the side information. In particular, statistical data is collected from the encoding or decoding of the video data of the training data set. Statistical differences in the data are binned based on combinations of side information previously encoded, such that the side information is already available within a bitstream.

By binning statistical differences between blocks based on combinations of side information available within the bitstream, the learning model can be used to determine multiple trained transforms. Where the binning reveals significant differences in those block statistics, the trained transforms may be better able to decorrelate corresponding prediction residuals. For example, by splitting large reference quantization indices, such as those having values greater than or equal to 140, from small reference quantization indices, such as those having values less than 140, observable differences in the transform process result from the use of different ones of the learned transforms. This may translate into rate-distortion gains and thus improvements to the coding process as compared to the use of conventional transform approaches.

Further details of techniques for video coding using inter-prediction mode-dependent transforms are described herein with initial reference to a system in which such techniques can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
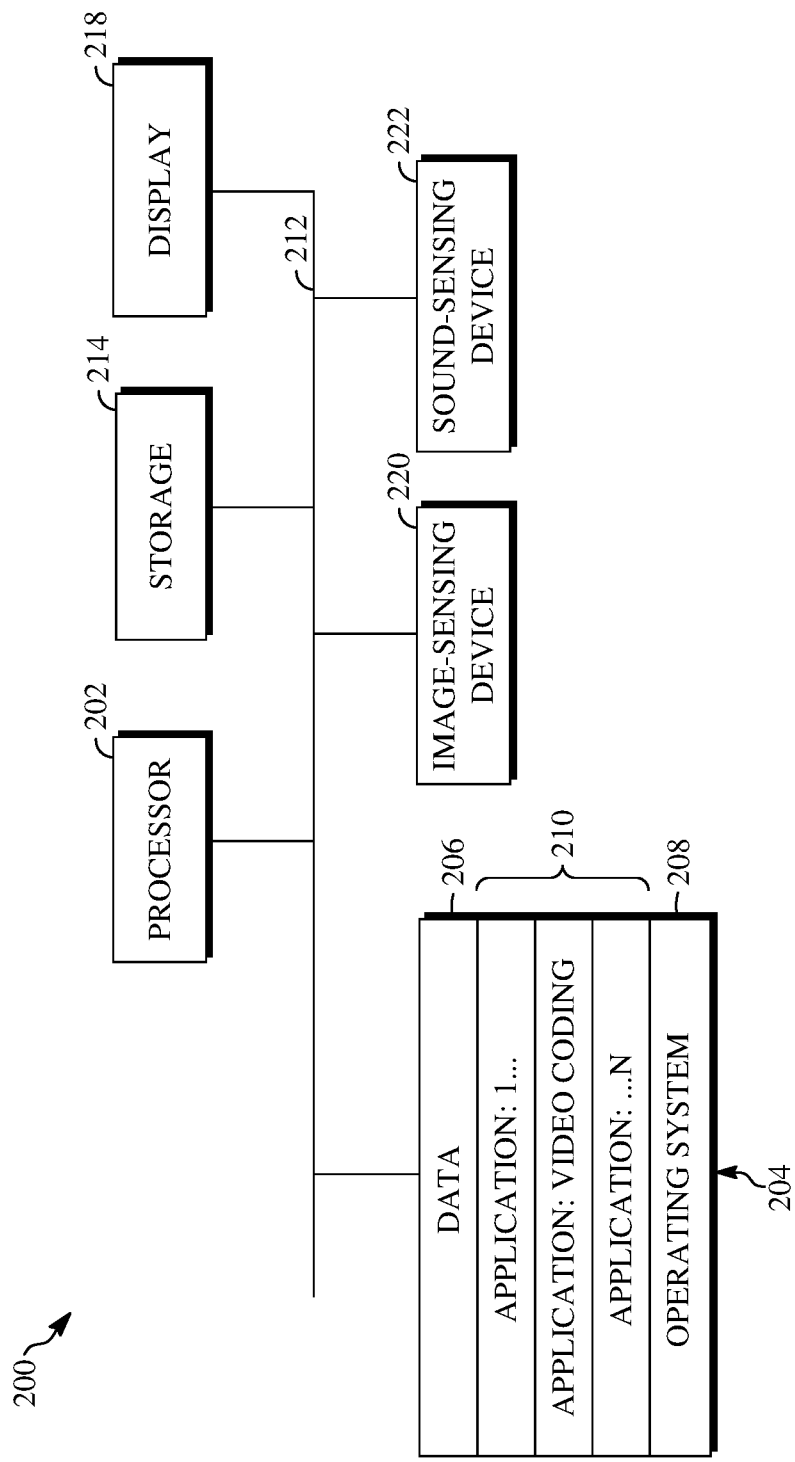
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
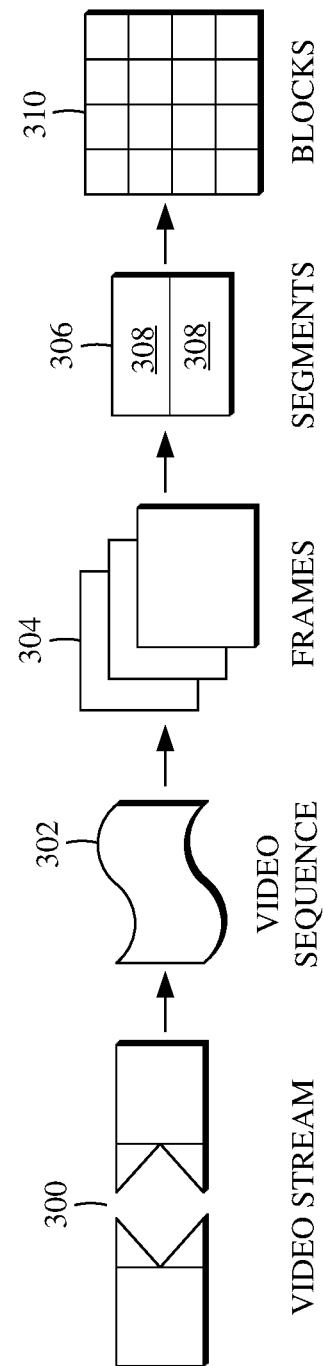
FIG. 3 is a diagram of an example of a video stream to be encoded and decoded.

FIG. 3 is a diagram of an example of a video stream 300 to be encoded and decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
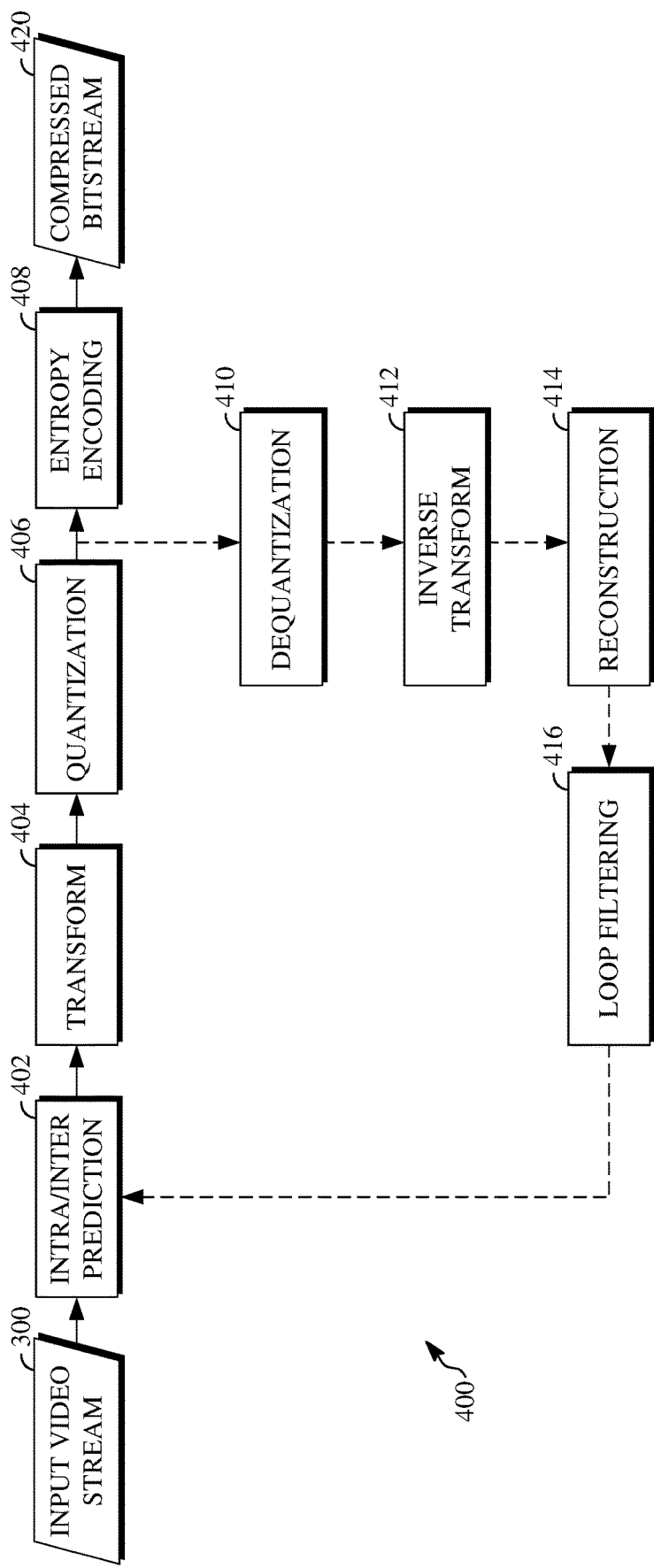
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In some implementations, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

In some cases, the functions performed by the encoder 400 may occur after a filtering of the video stream 300. That is, the video stream 300 may undergo pre-processing according to one or more implementations of this disclosure prior to the encoder 400 receiving the video stream 300. Alternatively, the encoder 400 may itself perform such pre-processing against the video stream 300 prior to proceeding to perform the functions described with respect to FIG. 4, such as prior to the processing of the video stream 300 at the intra/inter prediction stage 402.

When the video stream 300 is presented for encoding after the pre-processing is performed, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters which may be applied at the loop filtering stage 416 include, without limitation, a deblocking filter, a directional enhancement filter, and a loop restoration filter.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
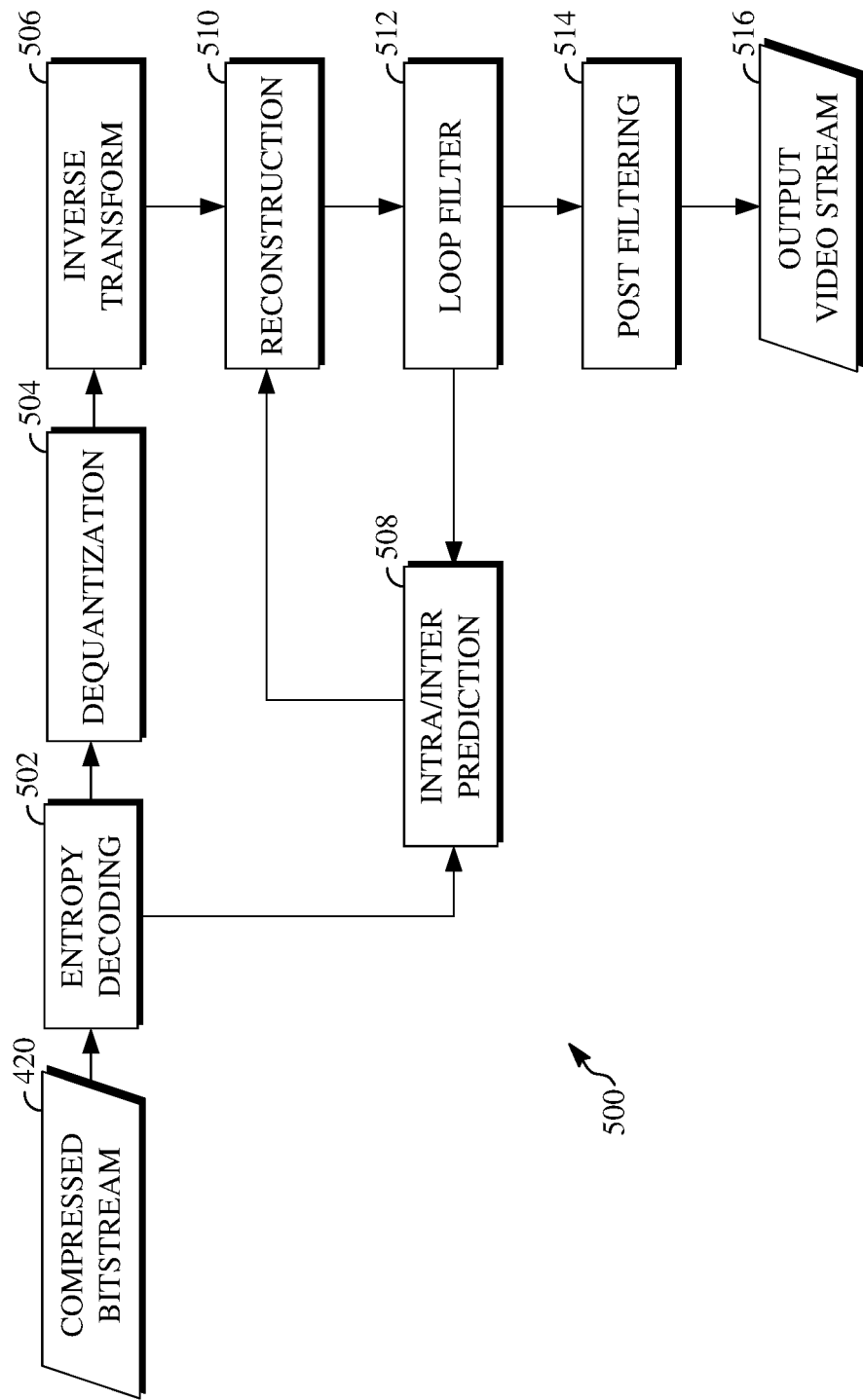
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106. In some implementations, the decoder 500 is a hardware decoder.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Examples of filters which may be applied at the loop filtering stage 512 include, without limitation, a deblocking filter, a directional enhancement filter, and a loop restoration filter. Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514 or otherwise omit the post filter stage 514.

Figure 6:
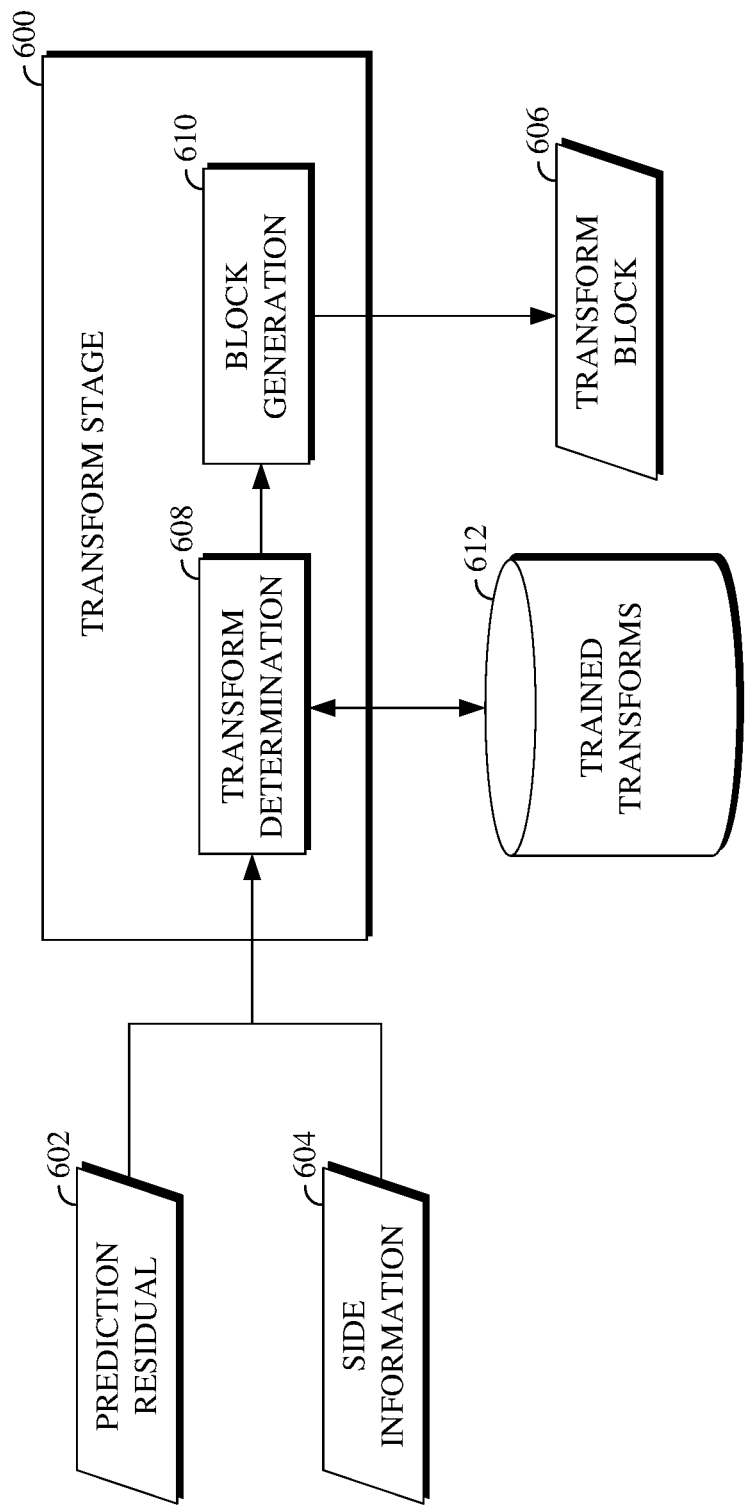
FIG. 6 is a block diagram of an example of a transform stage of an encoder.

FIG. 6 is a block diagram of an example of a transform stage 600 of an encoder. The transform stage 600 may, for example, be the transform stage 404 of the encoder 400 shown in FIG. 4.

The transform stage 600 takes as input a prediction residual 602 produced as output from a prediction stage (e.g., the intra/inter prediction stage 402 shown in FIG. 4) and side information 604 previously encoded from a same input video stream which includes a video block predicted to produce the prediction residual 602. The transform stage 600 produces as output a transform block 606 representative of the data of the prediction residual 602 transformed into the transform domain.

The side information 604 represents values of one or more individual side information types or of one or more combinations of the individual side information types. Examples of individual side information types include, but are not limited to, an indication of whether an inter-predicted encoded video block is a single-reference encoded video block or a compound-reference encoded video block, one or more reference frames used for encoding the inter-predicted encoded video block, a quantization index of the inter-predicted encoded video block representative of an encoding quality of the inter-predicted encoded video block, a quantization index of the reference frame representative of an encoding quality of each of the one or more reference frames, or one or both of a magnitude or a direction of a motion vector used for predicting the inter-predicted encoded video block.

The transform stage 600 includes a trained transform determination stage 608 and a transform block generation stage 610. The trained transform determination stage 608 determines a trained transform for transforming the prediction residual 602 based on the side information 604. In particular, the trained transform determination stage 608 determines the trained transform from amongst multiple trained transforms 612 available to the transform stage 700. The trained transform determination stage 608 evaluates the prediction residual 602 in view of the side information 604 to determine which of the trained transforms 612 to use to transform the prediction residual 602, in which each of the trained transforms 612 is determined using different video data and types and values of side information.

A trained transform 612 is, includes, or otherwise refers to a transform matrix which has been produced as a result of training using different video data and types and values of side information. The trained transforms 612 are determined using a learning model. For example, the learning model may evaluate various training data, including video data and individual side information and combinations of side information, to determine the trained transforms 612. The trained transforms 612 may be Karhunen-Loeve transforms (KLTs) or variations on KLTs. Alternatively, the trained transforms 612 may be different transforms or variations thereof. Implementations and examples of using a learning model to determine the trained transforms 612 are discussed below with respect to FIG. 8.

As used herein, the learning model may be a machine learning model. For example, the machine learning model may be or include one or more of a neural network (e.g., a convolutional neural network, recurrent neural network, or other neural network), decision tree or other decision network, support vector machine, Bayesian network, genetic algorithm, deep learning system separate from a neural network, or other machine learning model. In some cases, the machine learning model may be of an unconventional structure or otherwise demonstrate unconventional functionality.

The transform block generation stage 610 generates transform blocks including transform coefficients, such as the transform block 606, using the trained transforms determined by the trained transform determination stage 608. The transform block 606 is then output for further processing, such as at a quantization stage of the encoder (e.g., the quantization stage 406 shown in FIG. 4).

Figure 7:
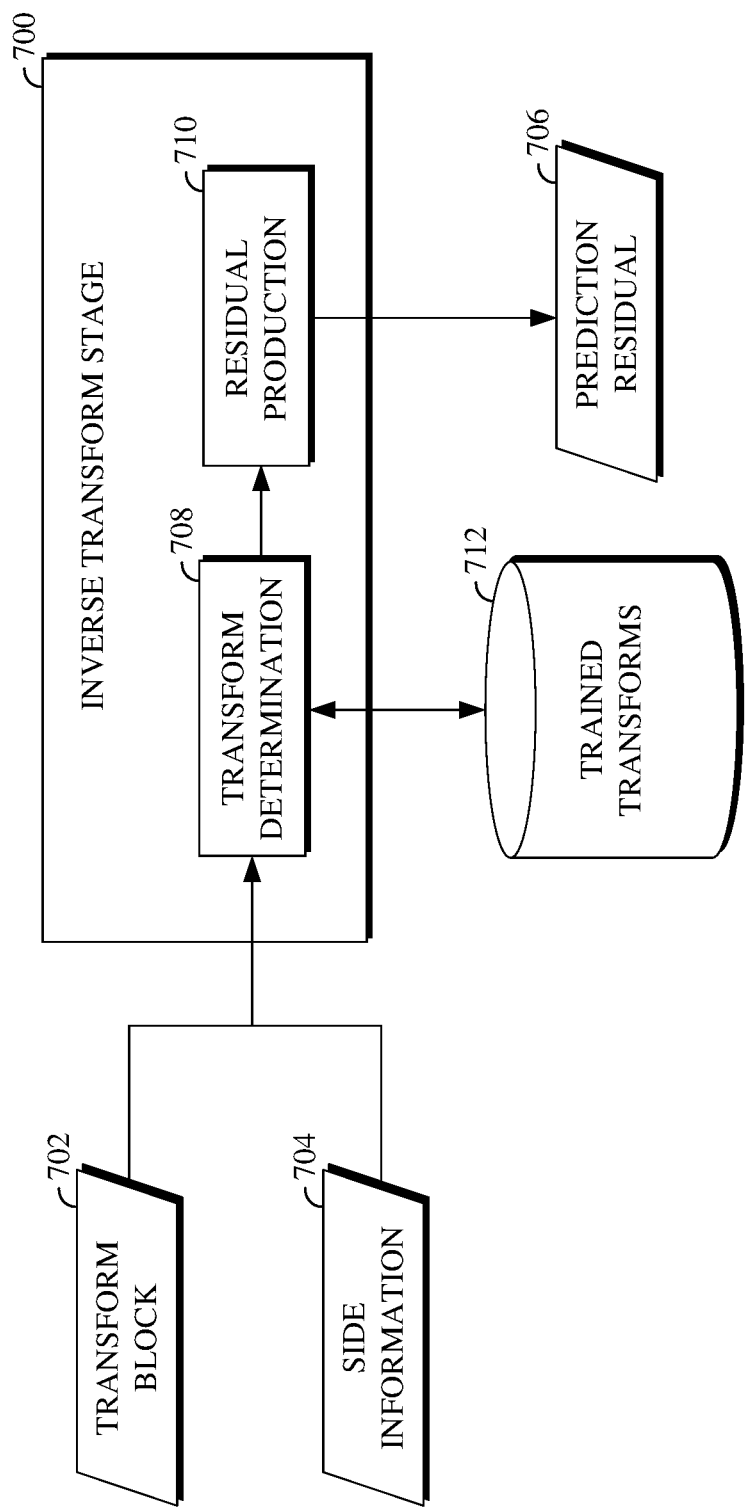
FIG. 7 is a block diagram of an example of an inverse transform stage of a decoder.

FIG. 7 is a block diagram of an example of an inverse transform stage 700 of a decoder. The inverse transform stage 700 may, for example, be the inverse transform stage 506 of the decoder 500 shown in FIG. 5.

The inverse transform stage 700 receives as input a transform block 702, such as which may be output from a dequantization stage (e.g., the dequantization stage 504 shown in FIG. 5) and side information 704 previously decoded from the bitstream which includes an encoded video block decoded to produce the transform block 702. For example, the transform block 702 and the side information 704 may respectively correspond to the transform block 606 and the side information 604 shown in FIG. 6. Examples of the side information may thus be those described with respect to the side information 604. The inverse transform stage produces as output a prediction residual 706, which may, for example, be or otherwise correspond to the prediction residual 602 shown in FIG. 6.

The inverse transform stage 700 includes a trained transform determination stage 708 and a prediction residual production stage 710. The trained transform determination stage 708 determines a trained transform for inverse transforming transform coefficients of the transform block 702 based on the side information 704. In particular, the trained transform determination stage 708 determines the trained transform from amongst multiple trained transforms 712 available to the inverse transform stage 700. The trained transform determination stage 708 evaluates the transform block 702 in view of the side information 704 to determine which of the trained transforms 712 to use to inverse transform the transform block 702, in which each of the trained transforms 712 is determined using different video data and types and values of side information.

The trained transforms 712 may be the trained transforms 612 shown in FIG. 6. Thus, as with the trained transforms 612, the trained transforms 712 are determined using a learning model. For example, the learning model may evaluate various training data, including video data and individual side information and combinations of side information, to determine the trained transforms 712. In another example, the trained transforms 712 may be KLTs or variations on KLTs. Alternatively, the trained transforms 612 may be different transforms or variations thereof. Implementations and examples of using a learning model to determine the trained transforms 712 are discussed below with respect to FIG. 8.

The prediction residual production stage 710 produces prediction residuals, such as the prediction residual 706, by inverse transforming transform coefficients of the transform block 702 using the trained transforms determined by the trained transform determination stage 708. The prediction residual 706 is then output for further processing, such as at a reconstruction stage of the decoder (e.g., the reconstruction stage 510 shown in FIG. 5) which uses the prediction residual 706 to reconstruct a video block which is then output within an output video stream (e.g., the output video stream 516 shown in FIG. 5).

In some implementations, instead of determining the trained transform based on the transform block 702 and the side information 704, a syntax element representative of the trained transform may be identified within the bitstream which includes the encoded video block from which the transform block 702 is derived. The syntax element may refer to one or more bits used to signal the trained transform to the decoder implementing the inverse transform stage 700. The trained transform determination stage 708 may use the syntax element to determine the trained transform for inverse transforming the transform block 702.

For example, the syntax element may be encoded to the bitstream by an encoder which uses a learning model to determine the trained transform for transforming a video block later encoded to produce the encoded video block corresponding to the transform block 702. In such an implementation, the trained transform for inverse transforming the transform block 702 may be determined at the trained transform determination stage 708 by comparing the value of the identified syntax element against a list of values corresponding to the different trained transforms.

Figure 8:
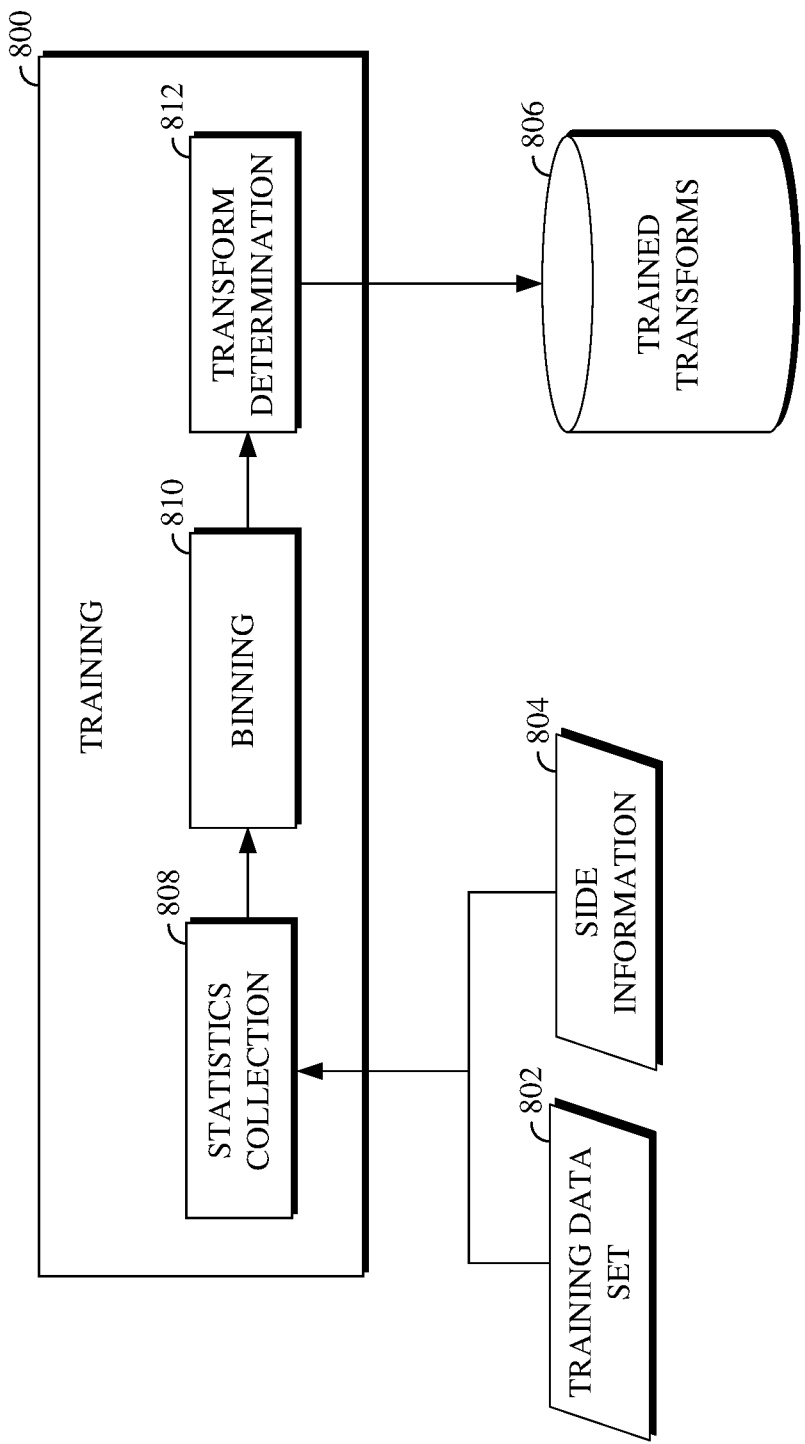
FIG. 8 is a block diagram of an example of training performed to determine trained transforms.

FIG. 8 is a block diagram of an example of training performed to determine trained transforms. The training is performed at a training stage 800 which is not included in an encoding pipeline or a decoding pipeline (e.g., of the encoder 400 shown in FIG. 4 or of the decoder 500 shown in FIG. 5, respectively). Rather, the training is performed offline to produce information usable during the encoding or decoding of video data. However, in some implementations, an encoder and/or a decoder (e.g., the encoder 400 and/or the decoder 500) may include the training stage 800, such as which may receive outputs of the encoding or decoding, respectively, to use as training data.

The training stage 800 receives as input a training data set 802 and side information 804, and produces as output trained transforms 806. The training data set 802 includes video data, which may be input video data to be encoded or encoded video data to be decoded. The side information 804 includes types and values of side information corresponding to one or more side information types. In particular, the side information 804 corresponds to individual side information types and combinations of the individual side information types. The training stage 800 uses the training data set 802 and the side information 804 to determine the trained transforms 806, which may, for example, be the trained transforms 612 shown in FIG. 6 or the trained transforms 712 shown in FIG. 7.

The training performed at the training stage 800 focuses on the principle that, unlike with intra-predicted video blocks, inter-predicted video blocks are not defined within the bitstream entirely based on the inter-prediction mode used therefor; rather, information associated with one or more reference frames and one or more motion vectors is transmitted along with an inter-predicted video block to indicate how to copy video data from elsewhere in the video stream. As a result, several different channels of side information are available within the bitstream, including, but not limited to, an indicator of whether the video block is predicted using a single-reference mode (e.g., a single reference frame) or a compound-reference mode (e.g., multiple reference frames), an indicator of the one or more reference frames used for the prediction, a quantization index of the video block representative of the encoding quality thereof, a quantization index of each of the one or more reference frames used for predicting the video block, a magnitude of the one or more motion vectors, or a direction of the one or more motion vectors.

The trained transforms 806 are transforms which include a horizontal transform and a vertical transform pair and are determined using the training performed at the training stage 800. The horizontal transform and/or the vertical transform of each of the trained transforms 806 is one of a mode-dependent transform determined at the training stage 800 or a flipped mode-dependent transform representing a flipped version of that mode-dependent transform.

For example, there may be eight trained transforms 806 determined using the training stage 800. The first may use a mode-dependent transform as a vertical transform and a mode-dependent transform as a horizontal transform. The second may use a mode-dependent transform as a vertical transform and DCT as a horizontal transform. The third may use DCT as a vertical transform and a mode-dependent transform as a horizontal transform. The fourth may use a flipped mode-dependent transform as a vertical transform and a flipped mode-dependent transform as a horizontal transform. The fifth may use a flipped mode-dependent transform as a vertical transform and DCT as a horizontal transform. The sixth may use DCT as a vertical transform and a flipped mode-dependent transform as a horizontal transform. The seventh may use a flipped mode-dependent transform as a vertical transform and a mode-dependent transform as a horizontal transform. The eighth may use a mode-dependent transform as a vertical transform and a flipped mode-dependent transform as a horizontal transform.

The training stage 800 includes a statistical data collection stage 808, a binning stage 810, and a trained transform determination stage 812. The statistical data collection stage 808 collects statistical data from the encoding or decoding of the video data of the training data set 802 based on different combinations of the side information 804. The statistical data indicates the effect of certain values and types of side information on inverse transforming certain transform coefficients. The statistical data may be, include, or otherwise refer to statistics representing transform coefficients produced as a result of encoding video data of the training data set 802 using transform matrices defined by different combinations of the side information 804, statistics representing prediction residuals produced as a result of decoding video data of the training data set 802 using transform matrices defined by different combinations of the side information 804, or statistics indicating encoding or decoding efficiency in connection with the encoding or decoding of the video data of the training data set 802 using transform matrices defined by different combinations of the side information 804.

The binning stage 810 bins statistical differences of the statistical data collected by the statistical data collection stage 808. Binning the statistical differences refers to grouping statistical differences according to values a type or combination of types of side information 804 used to result in those statistical differences.

The trained transform determination stage 812 determines the trained transforms 806 based on the binned statistical differences. In particular, at the trained transform determination stage 812, a learning model, such as a decision network, is used to evaluate the binned statistical differences to determine the trained transforms 806. The determined trained transforms 806 are then made available during encoding and/or decoding, such as at a transform stage of an encoder (e.g., the transform stage 600 shown in FIG. 6) and/or an inverse transform stage of a decoder (e.g., the inverse transform stage 700 shown in FIG. 7).

For example, a set of video data of the training data set which is encoded or decoded using a first type or first combination of types of side information may be binned into a first bin, and the same set of video data encoded or decoded using a second type or second combination of types of side information may be binned into a second bin. Rate-distortion or other analytical values computed for the data in the first bin and the data in the second bin may be compared to determine which bin has the more effectively transformed video data. A trained transform may thus be determined using the type or combination of types of side information corresponding to that bin. That trained transform may be determined, such as at a transform stage or an inverse transform stage (e.g., the transform stage 600 or the inverse transform stage 700), for video data similar to the set of video data of the training data set (e.g., in block size, pixel value distribution, or the like) having side information similar to that of the bin used to determine the trained transform.

In another example, a set of video data of the training data set which is encoded or decoded using a type or combination of types of side information may be binned into a first bin based on the values of that type or combination of types of side information of the set of video data, and a different set of video data encoded or decoded using the same type or combination of types of side information may be binned into a second bin based on the values of that type or combination of types of side information of the different set of video data. A first trained transform may be determined using the information in the first bin, and a second trained transform may be determined using the information in the second bin. At a transform stage or an inverse transform stage (e.g., the transform stage 600 or the inverse transform stage 700), one of the first trained transform or the second trained transform may be determined for transforming or inverse transforming current video data based on values of side information of the current video data corresponding to the same type or combination of types of side information as were used to determine the first and second trained transforms. For example, where the values of the side information of the current transform are the same as or similar to those of the first bin, the transform stage or inverse transform stage can determine to use the first trained transform.

Figure 9:
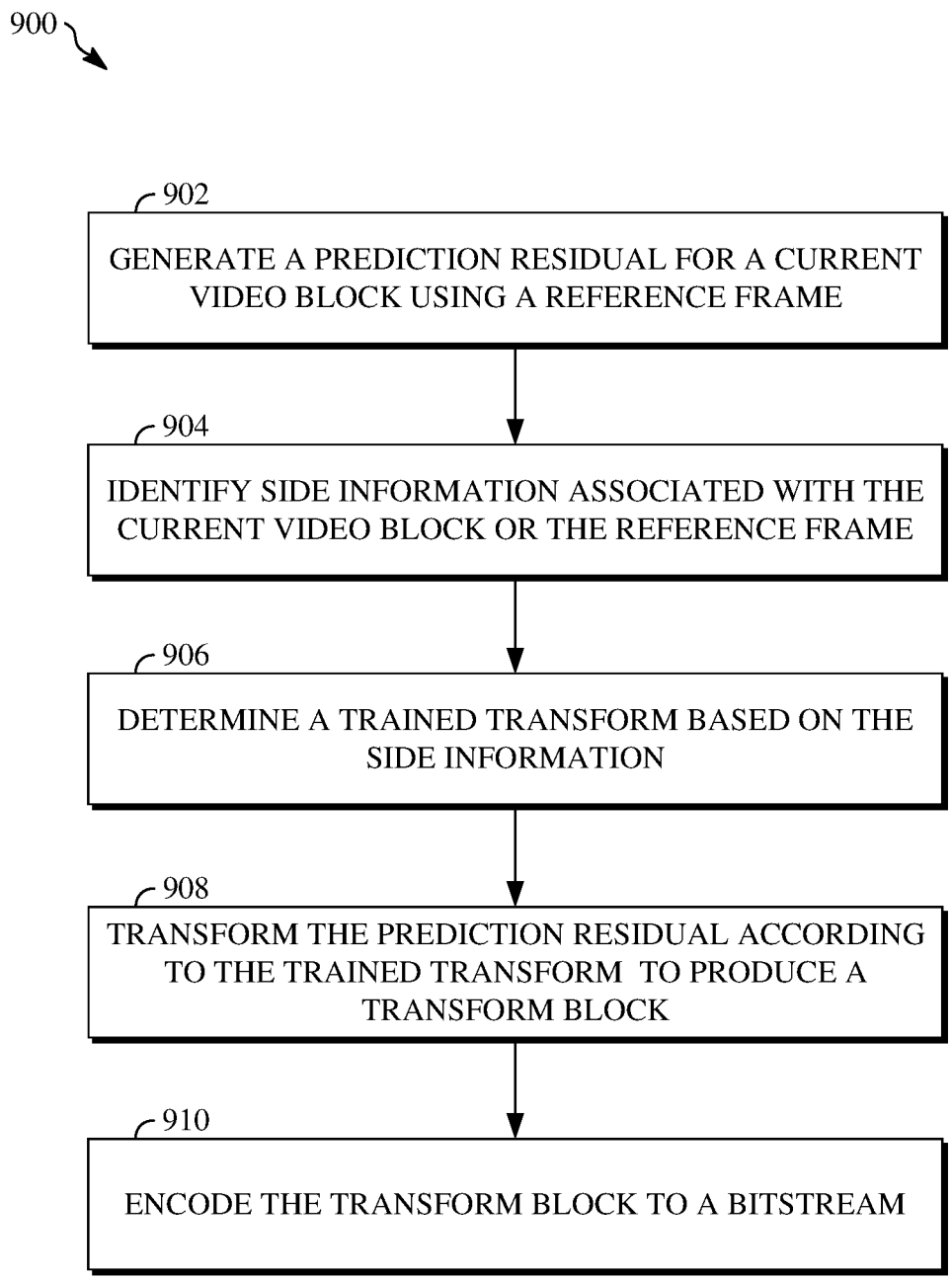
FIG. 9 is a flowchart diagram of an example of a technique for encoding an inter-predicted video block using an inter-prediction mode-dependent transform.
Figure 10:
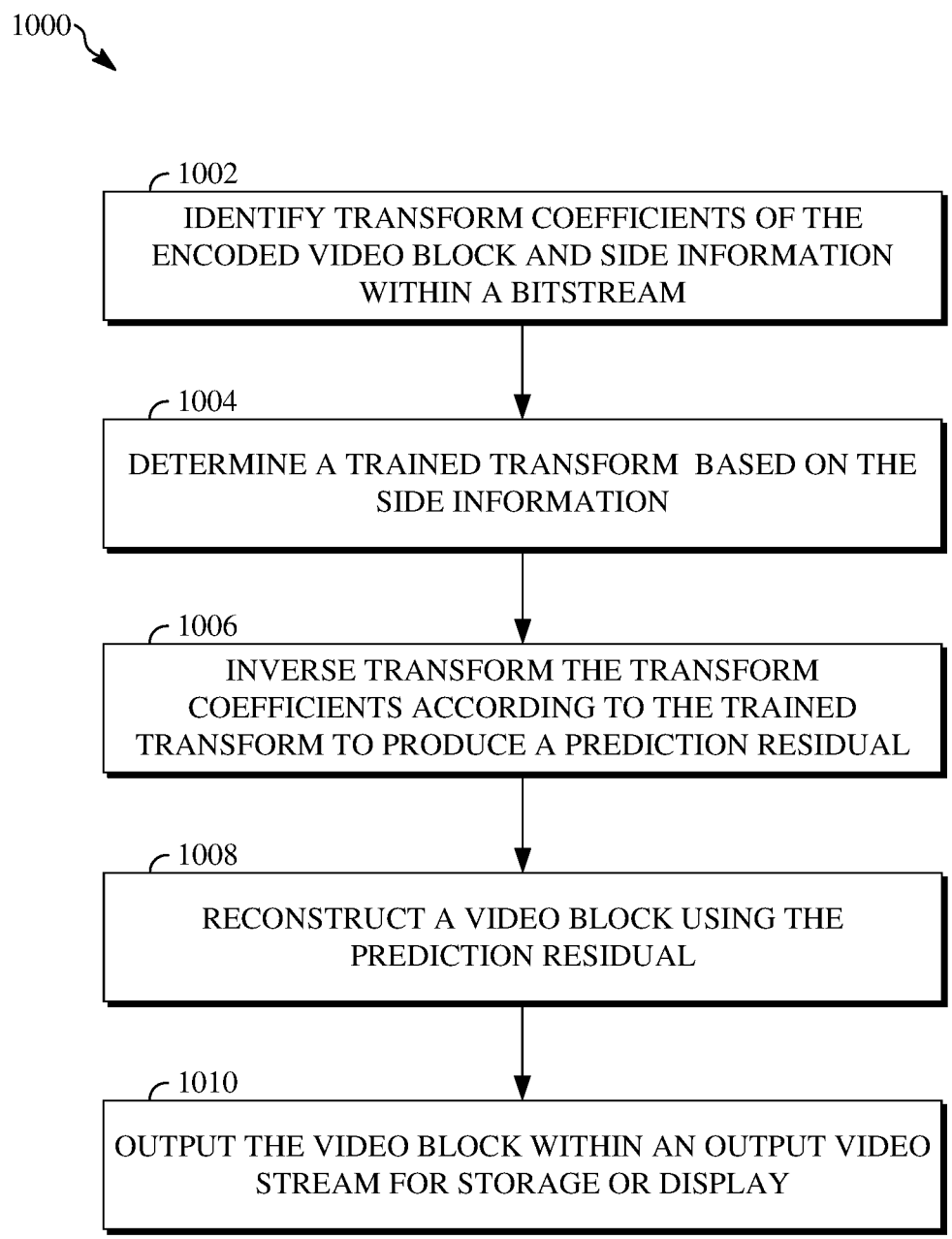
FIG. 10 is a flowchart diagram of an example of a technique for decoding an inter-predicted encoded video block using an inter-prediction mode-dependent transform.

Further details of techniques for video coding using inter-prediction mode-dependent transforms are now described. FIG. 9 is a flowchart diagram of an example of a technique 900 for encoding an inter-predicted video block using an inter-prediction mode-dependent transform. FIG. 10 is a flowchart diagram of an example of a technique 1000 for decoding an inter-predicted encoded video block using an inter-prediction mode-dependent transform.

The technique 900 and/or the technique 1000 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 900 and/or the technique 1000. The technique 900 and/or the technique 1000 can be implemented using specialized hardware or firmware. For example, a hardware component configured to perform the technique 900 and/or the technique 1000. As explained above, some computing devices may have multiple memories or processors, and the operations described in the technique 900 and/or the technique 1000 can be distributed using multiple processors, memories, or both.

For simplicity of explanation, the techniques 900 and 1000 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 9, the technique 900 for encoding an inter-predicted video block using an inter-prediction mode-dependent transform is shown. At 902, a prediction residual is generated for the inter-predicted video block. In particular, the prediction residual is generated by predicting the video block using one or more reference frames.

At 904, side information associated with one or both of the inter-predicted video block or the one or more reference frames used to generate the prediction residual is identified. The side information is side information used to determine a trained transform for transforming the video block. The side information represents values of one of the individual side information types or one of the combinations of the individual side information types. The side information is associated with one or both of the inter-predicted video block or the one or more reference frames used for generating the prediction residual for the inter-predicted video block. The side information is thus identified by searching the previously encoded information of the same input video stream for information associated with the inter-predicted video block and/or the one or more reference frames.

At 906, a trained transform is determined for the prediction residual of the inter-predicted video block based on the side information. Determining the trained transform includes identifying a trained transform from amongst multiple trained transforms based on the side information. That is, the encoder has visibility into which trained transforms were determined using which types of side information. The encoder can use the side information to determine a trained transform which was determined, using the learning model, using the same type or types of side information.

The learning model is used prior to the encoding of the inter-predicted video block to determine multiple trained transforms using different types of side information. The different types of side information refer to types of side information received from different channels of the coding process and thus to types of side information which are previously encode to a bitstream to which the video block will be encoded. The types of side information include individual side information types and combinations of the individual side information types. Each of the individual side information types may, for example, be a side information type described with respect to the side information 604 shown in FIG. 6.

Using the learning model to determine the trained transforms includes encoding video blocks of a training data set using individual side information types and combinations of the individual side information types. Statistical data is collected from the encoding of the video blocks of the training data set. The statistical data indicates the effect of certain values and types of side information on inverse transforming certain transform coefficients. Statistical differences between the video blocks of the training data set resulting from the encoding of the video blocks are binned, and ones of the trained transforms for transforming prediction residuals of the video blocks are determined based on the statistical differences.

As such, the collected statistical data is usable to determine which transforms are effective for transforming those certain prediction residuals. Where the binning reveals significant differences in those block statistics, the trained transforms may be better able to decorrelate corresponding prediction residuals. For example, by splitting large reference quantization indices, such as those having values greater than or equal to 140, from small reference quantization indices, such as those having values less than 140, observable differences in the transform process result from the use of different ones of the learned transforms. As such, in this example, a first trained transform for the quantization index side information type can be determined based on a first value (e.g., a value greater than or equal to 140) and a second trained transform also for the quantization index side information type can be determined based on a second value different from the first value (e.g., a value less than 140).

The multiple trained transforms include at least two trained transforms, which are transforms produced as a result of a training using side information types and values thereof. Each of the trained transforms includes a different pair of horizontal and vertical transforms. In particular, the pair of horizontal and vertical transforms for each of the trained transforms includes one or both of a mode-dependent transform or a flipped mode-dependent transform. The mode-dependent transform is determined including by aggregating row and column information of the video blocks of the training data set. The flipped mode-dependent transform is a flipped version of the mode-dependent transform. Examples of the trained transforms which include the mode-dependent transform and/or the flipped mode-dependent transform are discussed above with respect to FIG. 8.

Returning to the encoding of the inter-predicted video block, where multiple trained transforms are determined for transforming the prediction residual of the inter-predicted video block, those multiple trained transforms may be considered as candidate trained transforms, and the encoder can further use the side information to determine which of those candidate trained transforms was determined using a value corresponding to a value represented by the side information. For example, where each of the candidate trained transforms corresponds to a quantization index of a reference frame, a first candidate trained transform may be determined based on a first quantization index value and a second candidate trained transform may be determined based on a second quantization index value, in which the first value and the second value are different values derived during the training of the trained transforms using the learning model, for example, from statistical differences determined by processing a training data set of video blocks.

In some implementations, determining the trained transform for transforming the prediction residual of the inter-predicted video block includes evaluating the prediction residual of the inter-predicted video block using at least some of the trained transforms to determine costs for at least some of the trained transforms. A determination is then made to use the trained transform for transforming the prediction residual of the inter-predicted video block based on the costs. The costs may be computed as a function of the pixel values of the prediction residual. Alternatively, the costs may be computed based on a rate-distortion optimization evaluation performed against the prediction residual of the inter-predicted video block using the different trained transforms.

At 908, the prediction residual of the inter-predicted video block is transformed according to the trained transform to produce a transform block including transform coefficients. At 910, the transform block is encoded to a bitstream. The bitstream is the same bitstream to which the one or more reference frames and the side information are encoded.

Referring next to FIG. 10, the technique 1000 for decoding an inter-predicted encoded video block using an inter-prediction mode-dependent transform is shown. At 1002, transform coefficients of the inter-predicted encoded video block and side information are identified within the bitstream. The transform coefficients of the inter-predicted encoded video block are video data which were encoded using one or more reference frames. The side information is side information used to determine a trained transform for inverse transforming the transform coefficients of the inter-predicted encoded video block. The side information represents values of one of the individual side information types or one of the combinations of the individual side information types. The side information is associated with one or both of the inter-predicted encoded video block or a reference frame used for encoding the inter-predicted encoded video block. Identifying the inter-predicted encoded video block and the side information within the bitstream includes decoding syntax elements, expressed as one or more bits, representative of the inter-predicted encoded video block and of the side information from the bitstream.

At 1004, a trained transform for inverse transforming the transform coefficients of the inter-predicted encoded video block is determined based on the side information. Determining the trained transform includes identifying a trained transform from amongst multiple trained transforms based on the side information. That is, the decoder has visibility into which trained transforms were determined using which types of side information. The multiple trained transforms are determined using a learning model prior to the decoding of the encoded inter-predicted video block. The decoder can use the side information identified from within the bitstream to determine a trained transform which was determined, using the learning model, using the same type or types of side information.

The learning model is used prior to the decoding of the inter-predicted encoded video block to determine multiple trained transforms using different types of side information. The different types of side information refer to types of side information received from different channels of the coding process and thus to types of side information which are included in a bitstream that also includes the encoded video block. The types of side information include individual side information types and combinations of the individual side information types. Each of the individual side information types may, for example, be a side information type described with respect to the side information 704 shown in FIG. 7.

Using the learning model to determine the trained transforms includes decoding encoded video blocks of a training data set using individual side information types and combinations of the individual side information types. Statistical data is collected from the decoding of the encoded video blocks of the training data set. The statistical data indicates the effect of certain values and types of side information on inverse transforming certain transform coefficients. Statistical differences between the encoded video blocks of the training data set resulting from the decoding of the encoded video blocks are binned, and ones of the trained transforms for inverse transforming the encoded video blocks are determined based on the statistical differences.

As such, the collected statistical data is usable to determine which transforms are effective for inverse transforming those certain transform coefficients. Where the binning reveals significant differences in those block statistics, the trained transforms may be better able to decorrelate corresponding prediction residuals. For example, by splitting large reference quantization indices, such as those having values greater than or equal to 140, from small reference quantization indices, such as those having values less than 140, observable differences in the transform process result from the use of different ones of the learned transforms. As such, in this example, a first trained transform for the quantization index side information type can be determined based on a first value (e.g., a value greater than or equal to 140) and a second trained transform also for the quantization index side information type can be determined based on a second value different from the first value (e.g., a value less than 140).

The multiple trained transforms include at least two trained transforms, which are transforms produced as a result of a training using side information types and values thereof. Each of the trained transforms includes a different pair of horizontal and vertical transforms. In particular, the pair of horizontal and vertical transforms for each of the trained transforms includes one or both of a mode-dependent transform or a flipped mode-dependent transform. The mode-dependent transform is determined including by aggregating row and column information of the encoded video blocks of the training data set. The flipped mode-dependent transform is a flipped version of the mode-dependent transform. Examples of the trained transforms which include the mode-dependent transform and/or the flipped mode-dependent transform are discussed above with respect to FIG. 8.

Returning to the decoding of the inter-predicted encoded video block, where multiple trained transforms are determined, those multiple trained transforms may be considered as candidate trained transforms, and the decoder can further use the side information identified within the bitstream to determine which of those candidate trained transforms was determined using a value corresponding to a value represented by the side information identified from within the bitstream. For example, where each of the candidate trained transforms corresponds to a quantization index of a reference frame, a first candidate trained transform may be determined based on a first quantization index value and a second candidate trained transform may be determined based on a second quantization index value, in which the first value and the second value are different values derived during the training of the trained transforms using the learning model, for example, from statistical differences determined by processing a training data set of encoded video blocks.

In some implementations, determining the trained transform for inverse transforming the transform coefficients of the inter-predicted encoded video block includes evaluating the transform coefficients of the inter-predicted encoded video block using at least some of the trained transforms to determine costs for at least some of the trained transforms. A determination is then made to use the trained transform for inverse transforming the inter-predicted encoded video block based on the costs. The costs may be computed as a function of the transform coefficients of the inter-predicted encoded video block.

At 1006, the transform coefficients of the inter-predicted encoded video block are inverse transformed according to the trained transform to produce a prediction residual. At 1008, a video block is reconstructed using the prediction residual. Reconstructing the video block using the prediction residual includes performing inter-prediction against the prediction residual using one or more reference frames. At 1010, the video block is output within an output video stream for storage or display.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400, the decoder 500, and the transcoder 600, or another encoder, decoder, or transcoder as disclosed herein) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102 can encode content into an encoded video signal and transmit the encoded video signal to the communications device. In turn, the communications device can then decode the encoded video signal. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
   generating a prediction residual for a current video block using a reference frame;
   determining, based on side information usable to encode one or both of the current video block or the reference frame and including data other than pixel values of the one or both of the current video block or the reference frame, a trained transform for transforming the prediction residual from amongst multiple trained transforms determined using individual side information types and combinations of the individual side information types, wherein the side information represents values of one of the individual side information types or one of the combinations of the individual side information types, wherein the multiple trained transforms are determined based on statistical differences between video blocks of a training data set resulting from encoding or decoding the video blocks, and wherein each of the multiple trained transforms includes a different pair of horizontal and vertical transforms;
   transforming the prediction residual according to the trained transform; and
   encoding the side information and data associated with the transformed prediction residual to a bitstream.

2. The method of claim 1, wherein a learning model is used to determine the trained transforms based on the statistical differences.

3. The method of claim 2, wherein a first trained transform of the trained transforms is determined based on a first value of an individual side information type of the individual side information types,
   wherein a second trained transform of the trained transforms is determined based on a second value of the individual side information type, and
   wherein the first value and the second value are derived from the statistical differences.

4. The method of claim 1, wherein the pair of horizontal and vertical transforms for each of the trained transforms includes one or both of a mode-dependent transform or a flipped mode-dependent transform, wherein the mode-dependent transform is determined by aggregating row and column information of the video blocks of the training data set, and wherein the flipped mode-dependent transform is a flipped version of the mode-dependent transform.

5. The method of claim 1, wherein determining the trained transform comprises:
   evaluating the prediction residual using at least some of the trained transforms to determine costs for the at least some of the trained transforms; and
   determining the trained transform based on the costs.

6. The method of claim 1, wherein the side information corresponds to an indication of whether the current video block is encoded using a single reference frame or multiple reference frames.

7. The method of claim 1, wherein the side information corresponds to the reference frame and one or more other reference frames.

8. The method of claim 1, wherein the side information corresponds to a quantization index representative of an encoding quality of the reference frame.

9. The method of claim 1, wherein the side information corresponds to one or both of a magnitude or a direction of a motion vector used for generating the prediction residual.

10. A method, comprising:
    transforming a prediction residual for a current video block according to a trained transform determined from amongst multiple trained transforms based on side information usable to encode one or both of the current video block or a reference frame used to generate the prediction residual, wherein the side information includes data other than pixel values of the one or both of the current video block or the reference frame, wherein the multiple trained transforms are associated with individual side information types and combinations of the individual side information types, wherein the trained transforms are determined based on statistical differences between video blocks of a training data set resulting from encoding or decoding the video blocks, wherein the side information represents values of one of the individual side information types or one of the combinations of the individual side information types, and wherein each of the multiple trained transforms includes a different pair of horizontal and vertical transforms; and
    encoding, to a bitstream, the side information and data associated with the transformed prediction residual.

11. The method of claim 10, wherein the side information is identified by searching previously encoded information of an input video stream which includes the current video block for information associated with one or both of the current video block or the reference frame.

12. The method of claim 10, wherein a learning model is used to determine the trained transforms based on the statistical differences.

13. The method of claim 12, wherein the pair of horizontal and vertical transforms for each trained transform of the multiple trained transforms includes one or both of a mode-dependent transform or a flipped mode-dependent transform, wherein the mode-dependent transform is determined by aggregating row and column information of the encoded video blocks of the training data set, and wherein the flipped mode-dependent transform is a flipped version of the mode-dependent transform.

14. A method, comprising:

encoding side information and data to a bitstream, wherein the side information is usable to encode one or both of a current video block or a reference frame available for generating a prediction residual of the current video block, wherein the side information includes data other than pixel values of the one or both of the current video block or the reference frame, wherein the data associated with the transform coefficients results from transforming the prediction residual according to a trained transform determined based on the side information, wherein the trained transform is one of multiple trained transforms associated with individual side information types and combinations of the individual side information types, and wherein the trained transforms are determined based on statistical differences between video blocks of a training data set resulting from encoding or decoding the video blocks.

15. The method of claim 14, wherein the side information represents values of one of the individual side information types or one of the combinations of the individual side information types.

16. The method of claim 14, wherein each of the trained transforms includes a different pair of horizontal and vertical transforms.

17. The method of claim 14, wherein a learning model is used to determine the trained transforms based on the statistical differences.

18. The method of claim 14, wherein the individual side information types correspond to different channels of an encoding process for encoding an input video stream including the current video block.

19. The method of claim 14, wherein the trained transform is determined based on costs determined by evaluating the prediction residual using at least some of the trained transforms.

20. The method of claim 14, wherein the side information corresponds to one or more of an indication of whether the current video block is encoded using a single reference frame or multiple reference frames, the reference frame and one or more other reference frames, a quantization index representative of an encoding quality of the reference frame, or one or both of a magnitude or a direction of a motion vector used for generating the prediction residual.

* * * * *